United States Patent [19]

Sommer

[11] 4,422,540
[45] Dec. 27, 1983

[54] CLUTCH/BRAKE UNIT WITH MODULAR HEAT EXCHANGER

[75] Inventor: Gordon M. Sommer, Boca Raton, Fla.

[73] Assignee: Sommer Co., Warren, Mich.

[21] Appl. No.: 248,304

[22] Filed: Mar. 27, 1981

[51] Int. Cl.³ .............................................. F16D 13/72
[52] U.S. Cl. ............................... 192/113 B; 192/18 A
[58] Field of Search ............ 192/113 A, 113 B, 30 W, 192/70.12, 18 A, 18 R, 17 A, 12 A; 165/39

[56] References Cited

U.S. PATENT DOCUMENTS

| 3,614,999 | 10/1971 | Sommer | 192/18 A |
| 3,696,898 | 10/1972 | Sommer | 192/18 A |
| 3,713,517 | 1/1973 | Sommer | 192/18 A |
| 4,095,644 | 6/1978 | Huff | 165/39 X |
| 4,194,606 | 3/1980 | Beneke | 192/18 A |

Primary Examiner—George H. Krizmanich
Attorney, Agent, or Firm—Harness, Dickey & Pierce

[57] ABSTRACT

A clutch/brake unit with a modular heat exchanger apparatus, the apparatus including a heat exchanger, oil flow control to the heat exchanger, low oil temperature and high oil temperature sensors associated with a control mechanism for starting and stopping the flow of cooling fluid through the heat exchanger, and an over temperature oil sensor associated with a control to stop the clutch/brake unit if the oil temperature is too high for proper utilization of the unit. The clutch/brake unit also includes a flywheel brake which can be readily pneumatically controlled, having a modular control mechanism.

8 Claims, 6 Drawing Figures

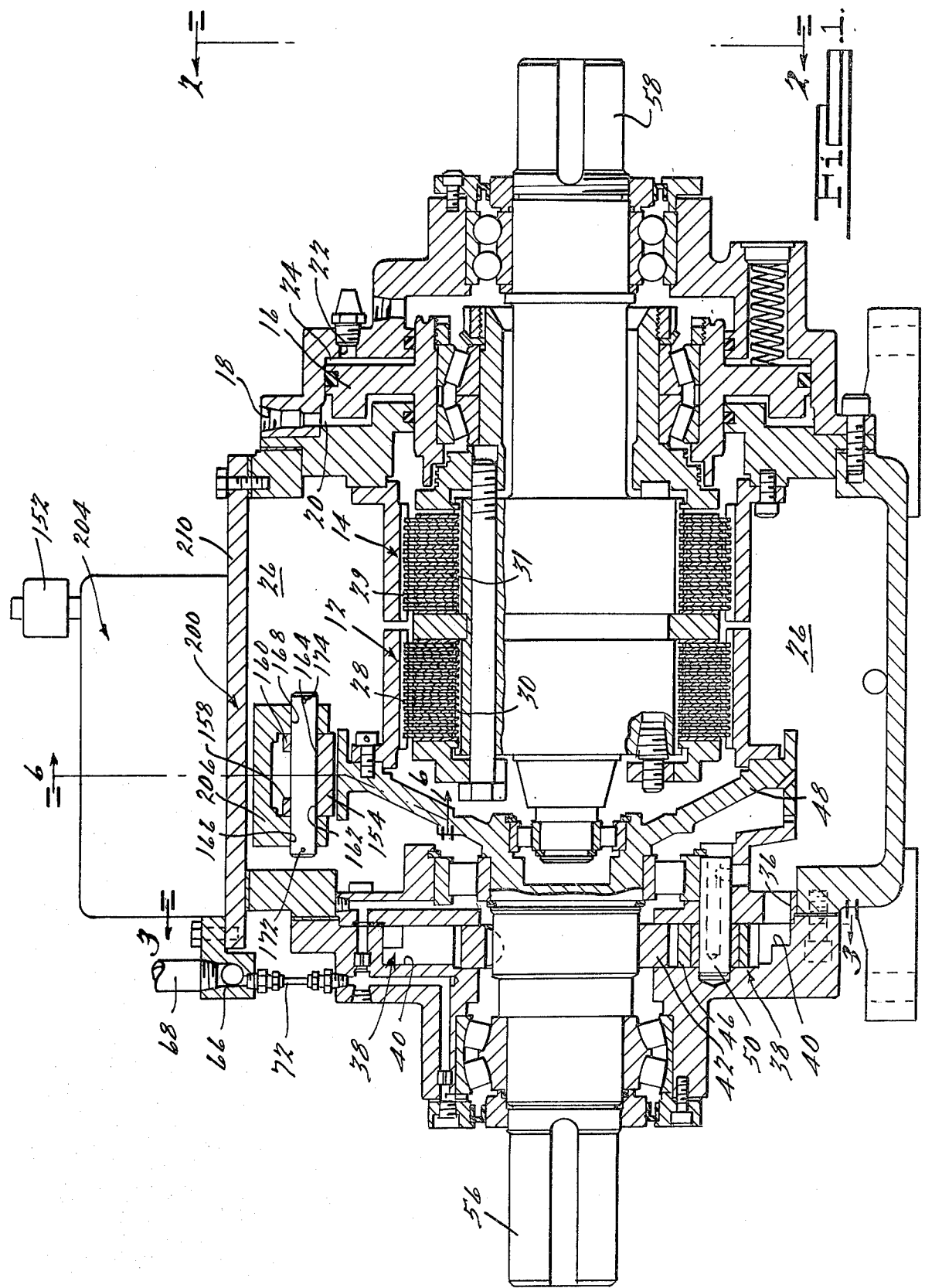

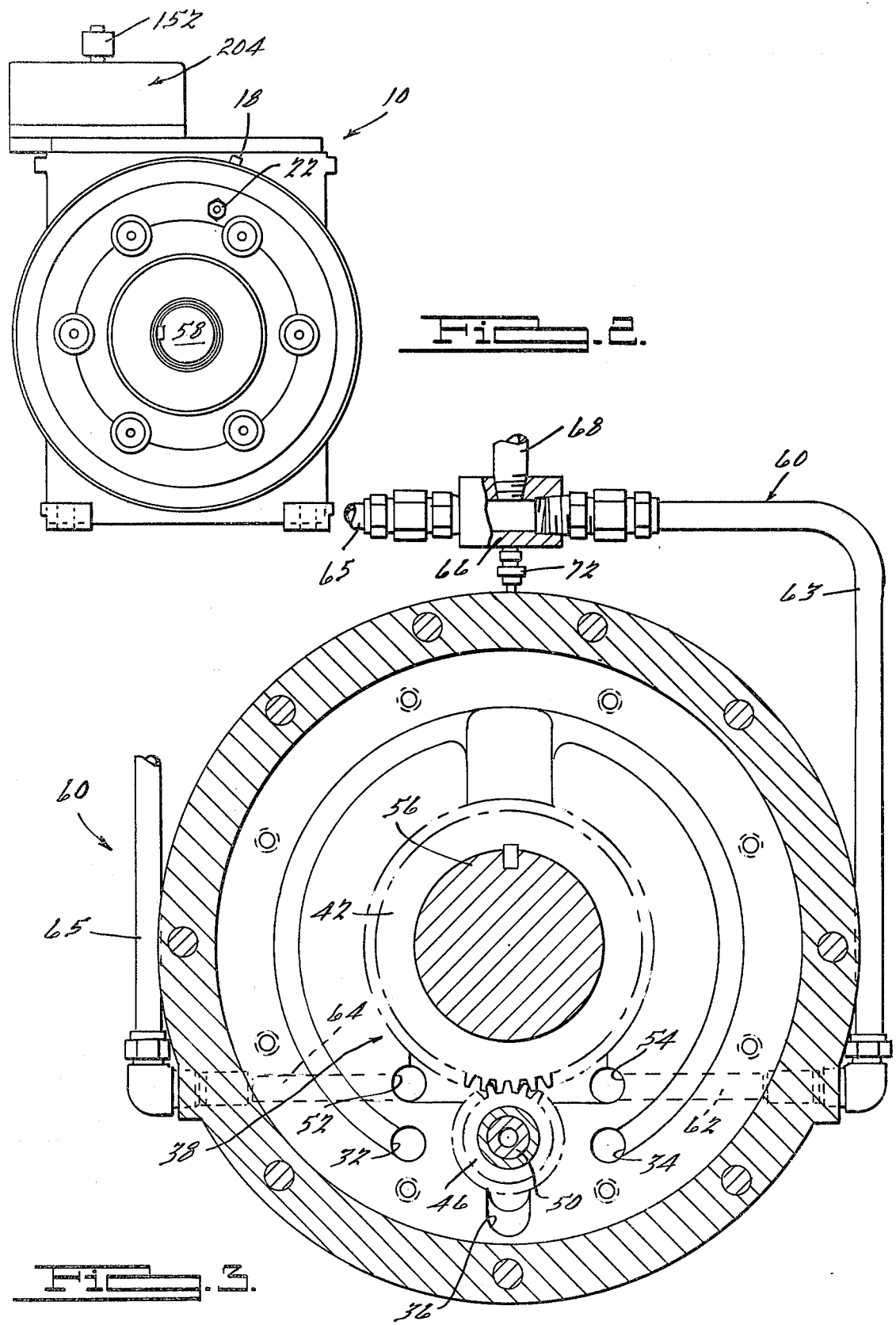

CLUTCH/BRAKE UNIT WITH MODULAR HEAT EXCHANGER

BACKGROUND AND SUMMARY OF THE INVENTION

The present invention relates generally to clutch/brake units and more particularly to a new and improved clutch/brake unit of the type shown in applicant's U.S. Pat. No. 3,696,898, issued to applicant on Oct. 10, 1972. More specifically, the improved clutch/brake unit has an improved modular heat exchanger unit for attachment thereto, along with an improved flywheel brake for braking of the device.

The clutch/brake unit of the present invention is specifically designed to have cooling oil circulating through the unit to cool the unit, which oil must be fed into a heat exchanger to cool the oil and prevent the unit from overheating. In the past the heat exchange was generally performed at a reservoir station fed by several units. The present invention has as one object thereof to provide a modular heat exchanger capable of cooling the oil from a clutch/brake unit as identified above and returning it to the unit at a suitable operating temperature.

A further object of the present invention is to provide such a modular heat exchanger with cooling fluid, such as water, lowering the temperature of the oil, while also providing controls for the water flow so that the water flow may be halted for periods of time when it is not needed, i.e. when the oil is not at a temperature at which it needs to be cooled by the cooling fluid. As part of this object, cost savings are also advantageously included in not wasting energy in cooling some fluid which is not performing its intended function.

A further object of the present invention is to provide sensing means for controlling the water flow that is responsive directly to the temperature of the oil. Another object is to include a control to shut off the entire clutch/brake unit master control if the oil temperature rises to a level wherein damage to the unit is possible and keeps the unit shut off until the oil cools below a desired temperature.

Another object is to provide flow controls in the oil lines of the heat exchanger to maintain a desired operating pressure and flow through the heat exchanger.

Another object of the present invention is to provide a flywheel brake which can be readily pneumatically controlled with a minimum of complicated parts.

Other objects and advantages of the instant invention will be apparent from the following specification, claims and drawings.

BRIEF DESCRIPTION OF THE DRAWINGS

FIG. 1 is a side sectional view of the clutch/brake unit of the present invention;

FIG. 2 is an end view of the clutch/brake unit of FIG. 1 looking in the direction of lines 2—2;

FIG. 3 is a vertical sectional view of the clutch/brake unit of FIG. 1 taken along the line 3—3 thereof;

DESCRIPTION OF THE PREFERRED EMBODIMENTS

Figure 4:
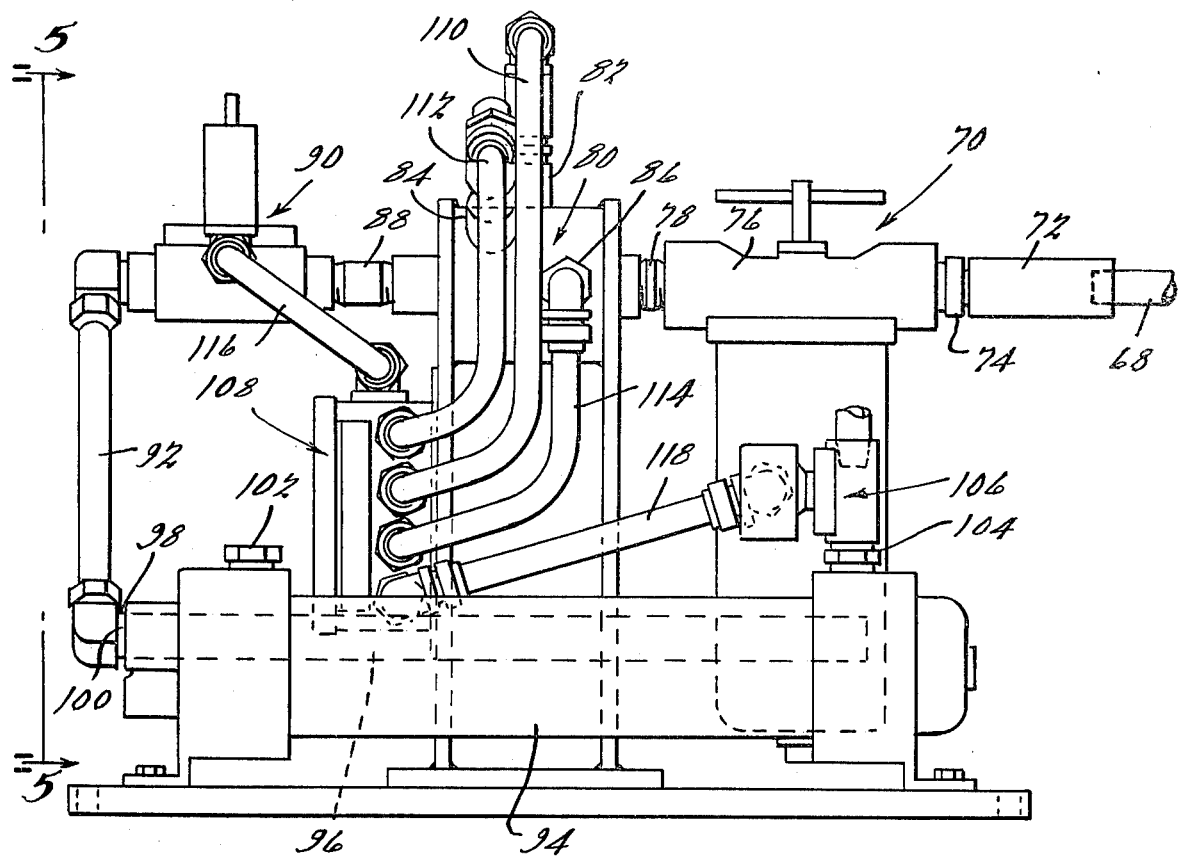
FIG. 4 is an elevated side view of the heat exchanger unit of the present invention.

Referring to FIGS. 1, 2 and 3, a clutch/brake unit 10 is illustrated having an oil circulation mechanism with which the present invention is associated. The unit 10 is essentially that set forth in applicant's U.S. Pat. No. 3,696,898, issued to applicant on Oct. 10, 1972, with some modifications as will be described. The clutch 12 and brake 14 mechanisms are piston-actuated by piston 16 controlled by air pressure through clutch inlet 18 to chamber 20 or brake inlet 22 to chamber 24. The plates and discs comprising the clutch and the brake portions of the unit 10 sit in a reservoir 26. The cooled oil is pumped into the reservoir 26 after passing through the plates 28, 29 and discs 30, 31 of the clutch 12 and brake 14 mechanisms. Oil is taken out of the reservoir 26 at pump inlet ports 32, 34, or 36 (FIGS. 1 and 3) into planetary gear pump mechanism 38 comprising an outer housing 40, a sun gear 42, and a planet gear 46 mounted to the flywheel 48 of the unit via pin 50. Oil is pumped out of the chamber via pump outlet ports 52 and 54. Suitable bearing means operably associates the input 56 and output 58 shafts of the unit, as described in applicant's above-noted patent.

Figure 5:
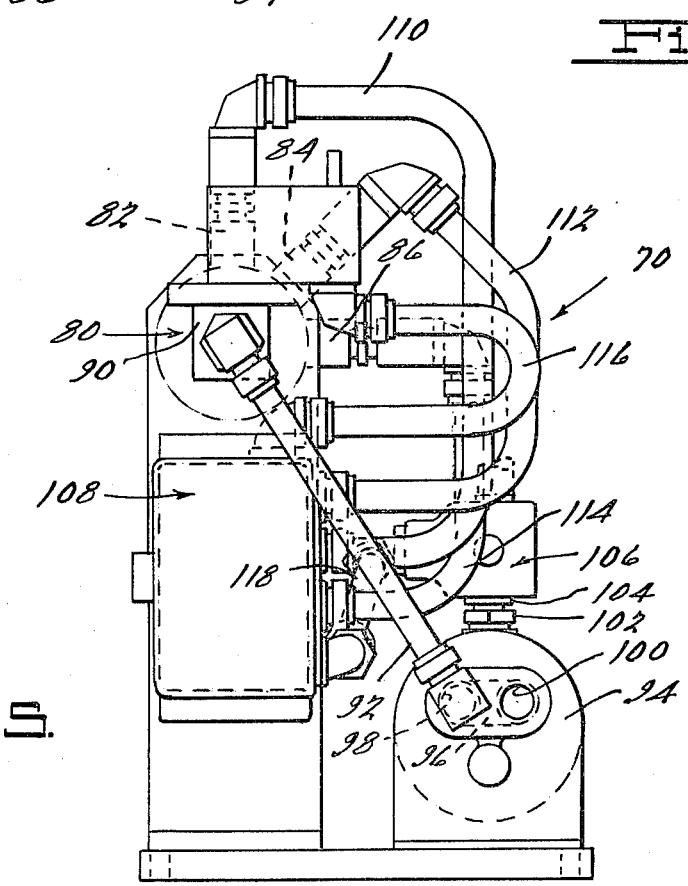
FIG. 5 is an elevated end view of the heat exchanger of FIG. 4.

In FIG. 3, the porting means 60 to a heat exchanger is shown from the outlet ports 52, 54 of the oil pump 38. Conduit means comprising conduits 62, 63, 64, and 65 communicates with both outlet ports 52, 54 of the pumping mechanism 38 to communicate the oil to a manifold 66 at the top of the unit 10. The manifold 66 merges the flow into another conduit 68 to communicate the oil to the modular heat exchanger apparatus 70 shown in FIGS. 4 and 5. Pressurized air is also added at the manifold 66 via conduit 72 to maintain a proper flow of oil even when the oil is at a relatively cool temperature.

The modular heat exchange apparatus 70 has an inlet check valve 72 which has a free flow in one direction but has a cracking pressure of 20 psi, to provide a minimum oil pressure throughout the modular heat exchange apparatus 70 when in operation. The oil passes through a reducing nipple 74 and a filter 76, through a second nipple 78, into a sensing manifold 80. The sensing manifold 80 includes low temperature 82, high temperature 84, and over temperature 86 sensing switches to sense the temperature of the oil. The sensing manifold 80 diverts the oil flow into another nipple conduit 88 communicating with a flow switch 90. The flow switch 90 communicates at its other end with a conduit 92 feeding into the actual elongated heat exchanger 94, said heat exchanger 94 having a U-shaped flow conduit 96 through which the oil travels from an inlet port 98 to an outlet port 100. Cooling water flows into the same elongated heat exchanger 94 at inlet port 102 and exits through outlet port 104 through a control valve 106 back to the cooling reservoir (not shown). A control mechanism 108 controls not only the water flow but the oil flow to maintain the proper cooling level for the unit. The three temperature sensing switches 82, 84, 86 of the sensing manifold 80 communicate with the control mechanism 108 via wires which are protected by wiring conduits 110, 112 and 114 respectively. The oil flow switch 90 is also controlled via the control mechanism 108 by wire which is disposed in wiring conduit 116. The control mechansim 108 is further connected to operate the water control valve 106, via wiring which is protected by wiring conduit 118.

Oil enters through the cracking check valve inlet 72 at sufficient pressure to pass through all parts of the apparatus 70. The low temperature sensor 82 is usually set at approximately 130° Fahrenheit, which the high temperature sensor 84 at 160° Fahrenheit and the over temperature sensor 86 at approximately 200° Fahrenheit. The sensors utilized in the preferred embodiment are thermoswitch temperature controls as manufactured by Fenwal Incorporated, Ashland, Mass., having the model designations #18021-0 for the low and high temperature switches 82, 84 and #18000-0 for the over temperature switch 86. Once 130° Fahrenheit oil is sensed, the water control valve 106 is opened and water is circulated through the modular heat exchange apparatus 70 to cool the oil. The flow control switch 90 monitors the oil flow and has a variable orifice therein to make sure a sufficient amount of oil under a sufficient amount of pressure reaches the modular heat exchange apparatus 70 to continue its proper flow pattern. Without the proper flow pattern, the entire master control for the clutch/brake unit 10 will be shut off by the flow control 90. The water will turn on at 160° Fahrenheit and turn off when the sensing means senses that the oil is below 130° Fahrenheit. The over temperature sensor 86 will shut off both the water and the oil when the temperature rises above 200° Fahrenheit of the oil. The heat exchange apparatus 70 will be disposed adjacent the clutch/brake unit 10 near the crown of the unit where hollow backups exist with ribs in them.

Figure 6:
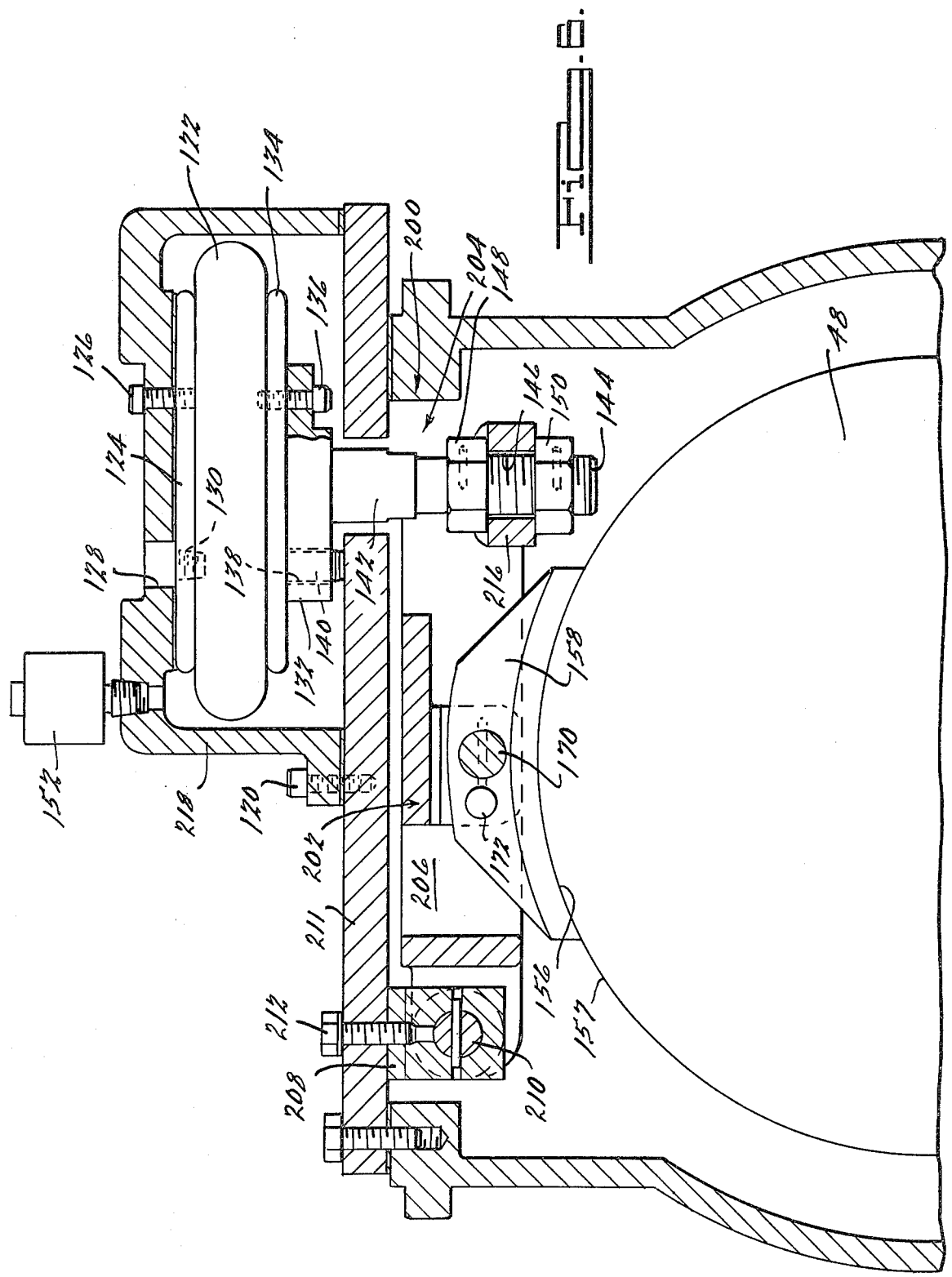
FIG. 6 is an exploded vertical sectional view of the flywheel brake unit of the clutch/brake unit of FIG. 1 taken along the line 6—6 thereof.

The clutch/brake unit 10 differs from the unit described in U.S. Pat. No. 3,696,898 in two essential respects. One is the planetary gear pump mechanism 38 described above. The other is the flywheel brake mechanism 200 as illustrated in FIGS. 1 and 6. The flywheel 48 represents the drum of the brake mechanism 200.

Referring to FIG. 6, the brake shoe assembly 202 and the control mechanism 204 therefor are illustrated. The brake shoe 202 is mounted to a pivot arm 206 having a U-shaped lateral cross section and pivoted on bracket 208 via pin 210. Bracket 208 is T-shaped and mounted to the top 211 of the clutch/brake unit 10 by bolt fastener 212. The opposite end of the arm 214 from the pivot 210 has a perpendicularly disposed integral flange 216 across the sides of the pivoted arm 214.

The control mechanism 204 is disposed in a housing 218 onto the top 211 of the unit 10 by suitable bolt fastening means 120. An air bag 122 has one end plate member 124 fixedly secured to the housing 218 by suitable bolt fasteners 126. An inlet port 128, including a threaded fitting 130 for a conduit supplying pressurized air, is disposed through the housing into the air bag 122 through upper plate member 124. A drive plate 132 is secured to the lower end plate member 134 of the air bag 122 by bolt fasteners 136. This lower end plate member 134 moves as a piston means as air under pressure is alternately supplied or not supplied to the air bag 122 by a suitable control (not shown). The drive plate 132 has a bore 138 in which a compression spring 140 is disposed, which spring 140 works between the top 211 of the clutch/brake unit 10 and the lower member 134 to bias the air bag 122 in a compressed position (as shown in FIG. 6) when air is not supplied.

An integral post 142 has a threaded end portion 144 that extends perpendicularly from the drive plate 132 through an aperture 146 in integral flange 216 of pivot arm 206. Lock nuts 148 and 150 are threadably attached to the post 142, spaced apart axially on each side of the flange 146. A breather 152 is also disposed at the top of the control housing 218.

The brake shoe assembly 202 comprises a replaceable shoe portion 154 having a braking surface 156 contoured to mate with the periphery 157 of the flywheel 48. The shoe 154 also has an upwardly extending U-shaped portion including flanges 158 and 160 each having an aperture 162 and 164 therein respectively. The pivoted arm 106 has corresponding apertures 166 and 168. The shoe 154 is fixedly secured to the arm 106 via a pin 170 inserted through apertures 162, 164, 166 and 168. Pin 170 is held in place by securement pins 172 and 174 at each end of the pin.

The control mechanism 204 is illustrated in FIG. 6 in engagement with air being supplied to the air bag 122. When no braking is desired, the air supply to air bag 122 is stopped and the bag 122 deflates, urged by spring 140, forcing the drive plate 132 upward which in turn urges the flange 216 upward. This movement moves pivot arm 206 upward pulling the brake shoe 154 out of engagement with the flywheel 48. Commencing the air supply reverses the process to re-engage the shoe 154 with the flywheel 48.

It should be noted that the lock nuts 148 and 150 on threaded portion 144 of drive post 142 also allow for adjustment to the brake shoe 154-flywheel 48 interface to optimize the braking action or control the speed of activation. This threaded adjustment assembly 144, 148, 150 also permits very fine adjustments to be made as desired.

While the above description constitutes the preferred embodiments of the present invention, it will be appreciated that the invention is susceptible to modification, variation and change without departing from the proper scope or fair meaning of the accompanying claims.

What is claimed is:

1. A heat exchange apparatus for use with an oil-cooled clutch/brake unit or the like, comprising
   cooling fluid;
   means for exchanging heat to said cooling fluid from oil from said unit passing through said apparatus;
   inlet and outlet conduit means to said heat exchanging means for said cooling fluid;
   means for sensing the temperature of oil entering said apparatus; and
   means for controlling the flow of said cooling fluid, including means for controlling the flow of said cooling fluid in response to the temperature of the oil sensed by said sensing means.

2. A claim in accordance with claim 1, further comprising means for controlling the flow of oil through said apparatus.

3. A claim in accordance with claim 2, wherein said oil flow control means comprises a cracking inlet check valve and a flow switch.

4. A claim in accordance with claim 1, wherein said means for sensing the oil temperature senses a temperature range and comprises a high temperature sensing means and a low temperature sensing means.

5. A claim in accordance with claim 4, wherein said high temperature sensing means activates said cooling fluid flow control means to commence the flow of cooling fluid through said heat exchanging means and said low temperature sensing means activates said cooling fluid control means to stop the flow of cooling fluid through said heat exchanging means.

6. A claim in accordance with claim 5, further comprising means for controlling the operation of the clutch/brake unit controlled by said oil temperature sensing means.

7. A claim in accordance with claim 1, further comprising means for controlling the operation of the clutch/brake unit controlled by said oil temperature sensing means.

8. A claim in accordance with claim 7, wherein said sensing means includes means for sensing a selected oil temperature at which operation of the clutch/brake unit is undesirable, wherein said clutch/brake unit control means halts the operation of said unit when the oil temperature rises over said selected temperature.

* * * * *